United States Patent
Sanathkumar et al.

(10) Patent No.: US 10,936,596 B2
(45) Date of Patent: Mar. 2, 2021

(54) DYNAMIC SELECTION OF DATA SOURCES FOR STREAMING DYNAMIC DATA

(71) Applicant: salesforce.com, inc., San Francisco, CA (US)

(72) Inventors: Mahalaxmi Sanathkumar, San Francisco, CA (US); Yogesh Patel, Dublin, CA (US); Shaahin Mehdinezhad Rushan, Dublin, CA (US); William Victor Gray, Kitchener (CA); William Edward Hackett, Vallejo, CA (US); Shreedhar Sundaram, San Mateo, CA (US); Rajkumar Pellakuru, San Jose, CA (US); Anjani Gupta, Redwood City, CA (US); Chandra S. Chadalavada, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 222 days.

(21) Appl. No.: 15/828,182

(22) Filed: Nov. 30, 2017

(65) Prior Publication Data

US 2019/0163791 A1     May 30, 2019

(51) Int. Cl.
  *G06F 16/2455* (2019.01)
  *G06F 16/21* (2019.01)
  *G06F 16/2458* (2019.01)
  *H04L 29/08* (2006.01)

(52) U.S. Cl.
  CPC ...... *G06F 16/24568* (2019.01); *G06F 16/219* (2019.01); *G06F 16/2471* (2019.01); *G06F 16/2474* (2019.01); *H04L 67/00* (2013.01)

(58) Field of Classification Search
  CPC ............. G06F 16/24568; G06F 16/219; G06F 16/2474
  USPC ........................................................ 707/769
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/986,251, filed Apr. 16, 2013.

*Primary Examiner* — Robert W Beausoliel, Jr.
*Assistant Examiner* — Pedro J Santos
(74) *Attorney, Agent, or Firm* — Dergosits & Noah LLP; Todd A. Noah (57) ABSTRACT

Dynamic selection of data sources for streaming dynamic data is described. A data streaming service receives a dynamic selection of a data source after the data streaming service begins executing, the dynamic selection of the data source including an identifier of a host of a multi-tenant database and an identifier of a tenant of multiple tenants storing data in the multi-tenant database. The data streaming service streams dynamic data from the data source to a data destination.

20 Claims, 5 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,341,420 B1 * | 7/2019 | Paola .................... H04L 67/02 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0082540 A1 * | 4/2008 | Weissman ........... G06F 21/6227 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0238622 A1 * | 9/2011 | Walters .................. G06F 16/273 |
| | | 707/610 |
| 2011/0258178 A1 * | 10/2011 | Eidson .............. G06F 17/30389 |
| | | 707/714 |
| 2012/0233137 A1 | 9/2012 | Jakobson et al. |
| 2013/0159344 A1 * | 6/2013 | Cahill .................... G06F 16/27 |
| | | 707/770 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0040162 A1 * | 2/2014 | McConnell ........ G06Q 30/0282 |
| | | 705/347 |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

\* cited by examiner

| Org ID | Entity | Entity ID | Value 1 | Value 2 | Value 3 | ... | Value 8 | ... |
|---|---|---|---|---|---|---|---|---|
| A | Customer | 999 | David | Smith | Apple | ... | 408-111-1111 | ... |
| A | Customer | 998 | Deborah | Johnson | Amazon | ... | 415-222-2222 | ... |
| A | Customer | 997 | James | Williams | Google | ... | 510-333-3333 | ... |
| B | Customer | 996 | John | Jones | Mom'n'Pop | ... | 628-444-4444 | ... |
| B | Customer | 995 | Linda | Brown | Acme | ... | 669-555-5555 | ... |
| B | Customer | 994 | Mary | Davis | MegaCorp | ... | 707-666-6666 | ... |
| C | Customer | 993 | Michael | Miller | Microsoft | ... | 831-777-7777 | ... |
| C | Customer | 992 | Patricia | Wilson | IBM | ... | 916-888-8888 | ... |
| C | Customer | 991 | Robert | Moore | Dell | ... | 925-999-9999 | ... |
| D | Customer | 990 | ... | ... | ... | ... | ... | ... |
| D | Customer | 989 | ... | ... | ... | ... | ... | ... |
| D | Customer | 988 | ... | ... | ... | ... | ... | ... |
| E | Customer | 987 | ... | ... | ... | ... | ... | ... |
| E | Customer | 986 | ... | ... | ... | ... | ... | ... |
| E | Customer | 985 | ... | ... | ... | ... | ... | ... |
| F | Customer | 984 | ... | ... | ... | ... | ... | ... |
| F | Customer | 983 | ... | ... | ... | ... | ... | ... |
| F | Customer | 982 | ... | ... | ... | ... | ... | ... |
| G | Customer | 981 | ... | ... | ... | ... | ... | ... |
| G | Customer | 980 | ... | ... | ... | ... | ... | ... |
| G | Customer | 979 | ... | ... | ... | ... | ... | ... |
| H | Customer | 978 | ... | ... | ... | ... | ... | ... |
| H | Customer | 977 | ... | ... | ... | ... | ... | ... |
| H | Customer | 976 | ... | ... | ... | ... | ... | ... |
| I | Customer | 975 | ... | ... | ... | ... | ... | ... |
| I | Customer | 974 | ... | ... | ... | ... | ... | ... |
| J | Customer | 973 | ... | ... | ... | ... | ... | ... |
| J | Customer | 972 | ... | ... | ... | ... | ... | ... |
| J | Customer | 971 | ... | ... | ... | ... | ... | ... |

DYNAMIC SELECTION OF DATA SOURCES FOR STREAMING DYNAMIC DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Figure 1:
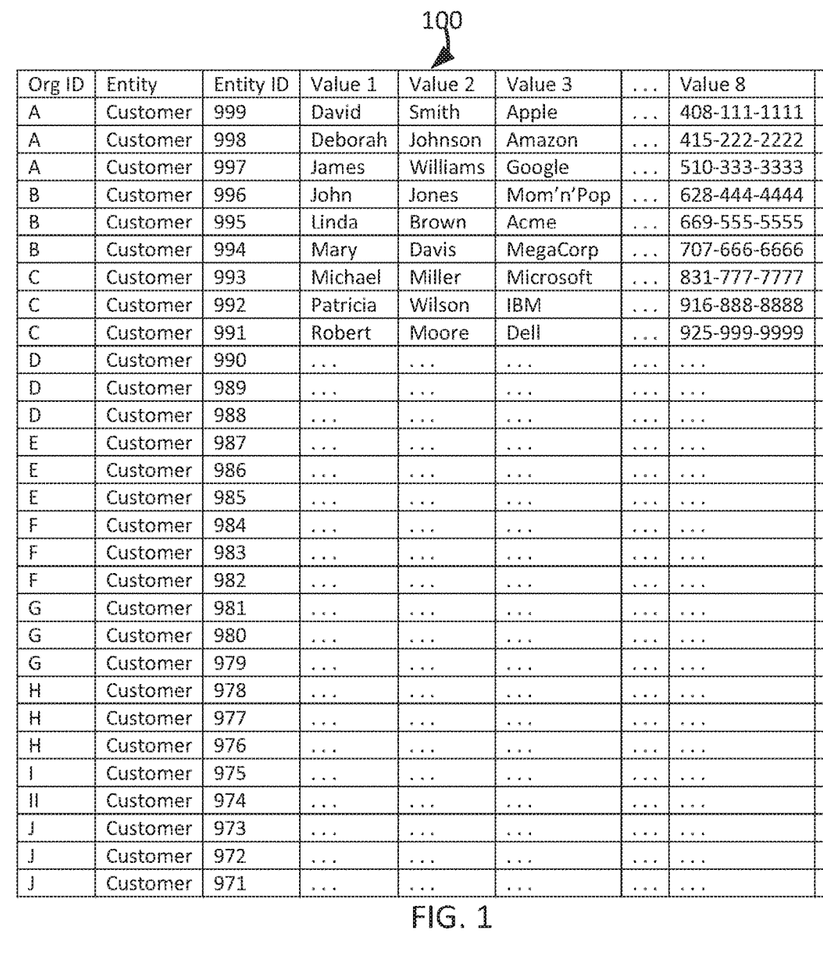
FIG. 1 illustrates a block diagram of a simplified example of a multi-tenant database table.

A database system can store information in digital objects, such as a database that stores digital objects for each customer in a customer relationship management (CRM) database. An object is a digital entity that can store information, such as a customer's given name, family name, job title, employer name, street address, city, state, zip code, e-mail address, and telephone number. FIG. 1 illustrates a block diagram of a simplified example of a multi-tenant database table 100, in which organizations A-J each store the names, employers, and telephone numbers for 3 of their organization's customers. A multi-tenant database can be an architecture in which a single instance of a software application retains information for many organizations, which may be referred to as tenants. While the database table 100 stores 3 rows of 7 columns of data for each of 10 organizations, the database table 100 may store any number of rows of any number of columns for any number of organizations.

A stream can be a sequence of data elements made available over time, such as modified data objects that are made available to a data streaming service for analysis in near real-time. The data elements in a stream may be processed one data element at a time rather than in large batches of data elements. A data processing service that can process a stream may produce another stream, and may be connected via a data pipeline. A data pipeline can be a channel that supplies information. A data streaming service can stream data from a multi-tenant database in near real-time for processing, such as streaming updated customer data as the customer data is updated, to a data processing service that generates metrics for the updated customer data, followed by streaming the generated metrics for the updated customer data back to the multi-tenant database for persistent storage and access by the tenants of the multi-tenant database.

BRIEF SUMMARY

Traditionally, a data source is identified for a data streaming service before the data streaming service begins executing. For example, a system administrator white-lists server 2, which stores a multi-tenant database, as one of a data streaming service's data sources. Then the data streaming service reads the white-list of servers at runtime, streams the data in server 2's multi-tenant database to a data processing service that generates metrics, and streams the generated metrics back to server 2's multi-tenant database, from which the tenants may be able to access the generated metrics for their data. However, server 2 may have to restrict access to generated metrics for tenants who have not subscribed to the data services, such that the generation of metrics for unsubscribed tenants was an inefficient use of system resources. Furthermore, white-listing a server that stores a significant amount of data for many unsubscribing tenants may result in system performance degradation.

In accordance with embodiments, there are provided systems and methods for dynamic selection of data sources for streaming dynamic data. A data streaming service receives a dynamic selection of a data source after the data streaming service begins executing, the dynamic selection of the data source including an identifier of a host of a multi-tenant database and an identifier of a tenant of multiple tenants storing data in the multi-tenant database. The data streaming service streams dynamic data from the data source to a data destination.

For example, after a data streaming service has already been streaming data, the data streaming service receives a system administrator's configured selection of Acme Corporation's CRM data that is stored in server 2's multi-tenant database as a data source for the data streaming service. Then the data streaming service streams Acme's live CRM data from server 2's multi-tenant database to a customer data metric generating service, and can stream the generated metrics for Acme's live CRM data back to server 2's multi-tenant database. The only data that the data streaming service streams from server 2 is Acme's CRM data, such that no system resources are spent on streaming or analyzing the data for the 9 other organizations that store data in server 2's multi-tenant database but do not subscribe to the data services. System resources are incrementally scaled up and down as needed to stream and analyze the data for the data service subscribers only with each addition of a new subscription and each cancellation of an existing subscription, without affecting the non-subscribers' access to their data in server 2's multi-tenant database.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for dynamic selection of data sources for streaming dynamic data. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, systems and methods for dynamic selection of data sources for streaming dynamic data will be described with reference to example embodiments. The following detailed description will first describe a system for dynamic selection of data sources for streaming dynamic data. Next, an example method for dynamic selection of data sources for streaming dynamic data is described.

Figure 2:
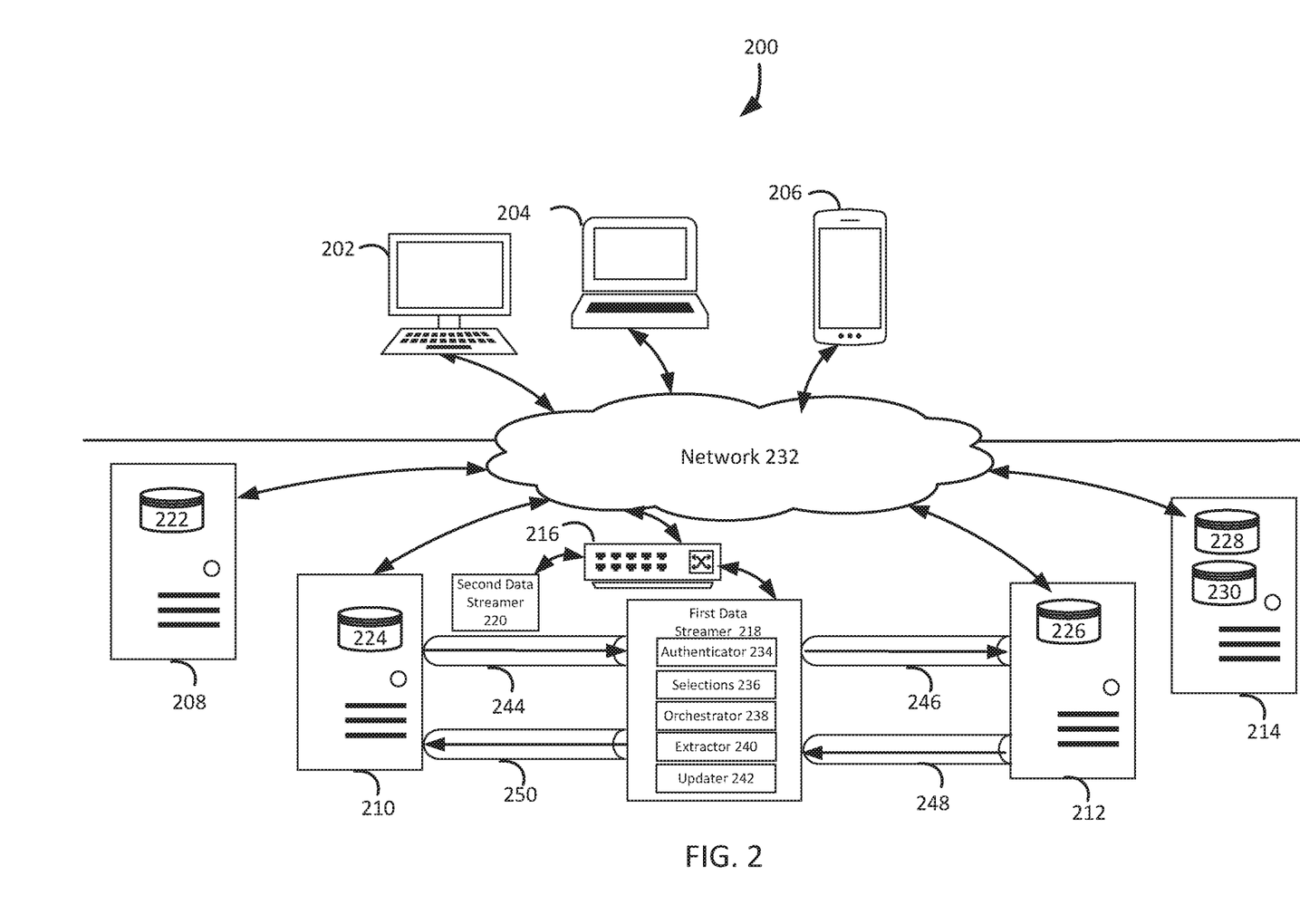
FIG. 2 illustrates a block diagram of an example system for dynamic selection of data sources for streaming dynamic data, in an embodiment.

FIG. 2 illustrates a block diagram of a system 200 that implements dynamic selection of data sources for streaming dynamic data, under an embodiment. As shown in FIG. 2, the system 200 may illustrate a cloud computing environment in which data, applications, services, and other resources are stored and delivered through shared datacenters and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second sever 210, a third server 212, a fourth server 214, a load balancer 216, a first data streamer 218, and a second data streamer 220 that may be provided by a hosting company. The data streamers 218 and 220 provide data streaming services to subscribers, such as users of the clients 202-206. The first server 208 stores a first multi-tenant database 222, the second sever 210 stores a second multi-tenant database 224, the third server 212 stores a first data processing database 226, and the fourth server 214 stores a second data processing database 228 and an orchestration database 230. The multi-tenant databases 222 and 224 may each be implemented by an Oracle database, the data processing databases 226 and 228 may each be implemented by a Kafka database, and the orchestration database 230 may be implemented by a Cassandra database. Although FIG. 1 depicts the first client 202 as the personal computer 202, the second client 204 as the laptop computer 204, and the third client 206 as the smart phone 206, any of the clients 202-206 may be any type of computer, such as the user system 412 depicted in FIG. 4 and described below. The servers 208-214 may each be substantially similar to the system 416 depicted in FIG. 4 and described below. The clients 202-206, the servers 208-214, the load balancer 216, and the data streamers 218 and 220 communicate via a network 232.

Although FIG. 2 depicts the system 200 with three clients 202-206, four servers 208-214, one load balancer 216, two data streamers 218 and 220, five databases 222-230, and one network 232, the system 200 may include any number of clients 202-206, any number of servers 208-214, any number of load balancers 216, any number of data streamers 218 and 220, any number of databases 222-230, and any number of networks 232. While FIG. 2 depicts the first data streamer 218 having an authenticator 234, selections 236, an orchestrator 238, an extractor 240, an updater 242, a first data supply tunnel 244, a second data supply tunnel 246, a first data return tunnel 248, and a second data return tunnel 250, the components 202-216 and 220 may be associated with these elements 234-250 or elements that are substantially similar to the elements 234-250. Furthermore, the elements 234-250 may be combined together and/or divided into additional elements.

A data streaming service may have already received a previous selection of a data source for streaming data to a data destination. For example, the first data streamer already received the selection of the server 208, which stores 10 organizations' data that is stored in the server 208's multi-tenant database 222, as a selected default server, and begun streaming multi-tenant database 222's data to the server 212 that provides the Salesforce IQ metric generating service. Salesforce IQ is an example of a data processing service. Then the data streaming service receives a dynamic selection of a data source after the data streaming service begins executing, the dynamic selection of the data source including an identifier of a host of a multi-tenant database and an identifier of a tenant of multiple tenants storing data in the multi-tenant database. For example, and without limitation, this can include the first data streamer 218 receiving via a listening port, such as a Representational State Transfer (REST) endpoint, a system administrator's configured selection, via the personal computer 202, of Acme Corporation's CRM data that is stored in server 210's multi-tenant database 224 as a non-default data source for the first data streamer 218, after the first data streamer 218 has already been streaming data. Security may be provided by the authenticator 234 restricting access to the listening port only to white-listed Internet Protocol (IP) addresses, such as the IP address of the system administrator's personal computer 202. A system administrator may select an identifier of the host of a multi-tenant database via various host identifiers, such as a server's name, IP address, and/or Uniform Resource Locator (URL).

A data streaming service can be system that makes a sequence of information elements available over time. A dynamic selection can be a change in a choice of something. A data source can be a place or thing from which information comes or can be obtained. An identifier can be a sequence of characters used to refer to an element. A host can be a computer that mediates multiple access to a database mounted on the computer and/or provides another service to a computer network. A tenant can be an organization that retains information in an architecture in which a single instance of a software application retains information for many organizations. Data can be the quantities, characters, or symbols on which operations are performed by a computer, being stored and transmitted in the form of electrical signals, and recorded on magnetic, optical, or mechanical recording media.

If the system 200 includes multiple data streamers 218 and 220, the load balancer 216 can appropriately direct dynamic selections of data sources to the multiple data streamers 218 and 220. The architectural decision of the number data streamers to provide for streaming a varying number of data sources may be based on performance benchmarks. For example, if the first data streamer 218 has been streaming data for the 10 organizations that store their data in the default server 208's multi-tenant database 222, a system administrator may not want the first data streamer 218 to stream data for any other organizations that store their data in the non-default server 210's multi-tenant database 224 if the system administrator is concerned that additional data streaming may degrade the performance for the first data streamer 218. Therefore, the system administrator may create an additional virtual machine to test an additional instance of a data streamer, and make dynamic selections of data sources that gradually increase the number of data sources for the additional instance of the data streamer. Performance degradation occurs for the additional instance of the data streamer with the addition of the $13^{th}$ data source for the test environment of the additional instance of the data streamer, without affecting the performance of the first data streamer 218's production environment. Consequently, the system administrator configures the system 200 to add an additional instance of a data streamer for each occasion that the system 200 adds 12 new data sources, and use the load balancer 216 to appropriately direct selections of data sources to the multiple instances of the data streamers.

If the system 200 includes multiple instances of the same type of data processing services, a load balancer that is not depicted in FIG. 2 can appropriately direct streamed data to the multiple instances of the same type of data processing services. Similar to the performance benchmark testing for data streamers, the system administrator can determine the number of data processing services needed to process data for varying numbers of data sources, configure the system to add new instances of the data processing services as needed, and use a load balancer to appropriately direct dynamic selections of data sources to the multiple instances of data processing services. If the data streamers 218 and 220 stream data to different types of data processing services, the system administrator's dynamic selection can also specify the data destination that provides a selected data processing service, such as the selection of the server 212 that provides the Salesforce IQ metric generating service.

After receiving the dynamic selection of the data source, the data streaming service optionally stores the dynamic selection of the data source in persistent storage. By way of example and without limitation, this can include the first data streamer 218 storing the system administrator's configured dynamic selection of Acme Corporation's CRM data that is stored in server 210's multi-tenant database 224 as a data source for the data streamer 218 into the selections 236 for local use and via the orchestrator 238 into the orchestration database 230 for persistent use, such as for streaming, auditing, resiliency, and/or logging, etc. A data streamer may be implemented via an Amazon Web Services virtual machine. If such a virtual machine temporarily fails and loses its local data, the persisted selection stored in the orchestration database may be retrieved for subsequent use. Although FIG. 2 depicts the orchestration database 230 stored on the server 214 that stores the data processing database 228, the orchestration database 230 may be stored on any type of persistent storage. Persistent storage can be the retention of retrievable data on a computer or other electronic system over a prolonged period of time.

Having received the dynamic selection of the data sources, the data streaming service can stream historical data from the data source to a data destination. In embodiments, this can include the first data streamer 218 creating the dedicated supply data pipeline 244 between the server 210 and the first data streamer 218, creating the dedicated supply data pipeline 246 between the first data streamer 218 and the server 212, and instructing the extractor 240 to use the Simple Object Access Protocol (SOAP) to extract Acme's historical CRM data from server 210's multi-tenant database 224. Then the first data streamer 218 streams the extracted Acme historical CRM data to the server 212 that provides the Salesforce IQ metric generating service. The streaming of historical data from the selected data source may be referred to as a day 0 process, which may require a significant amount of system resources to process historical data that has accumulated over a relatively long period of time, and may be necessary to prepare for the subsequent data processing of live data from the dynamically selected data source. After receiving Acme's historical CRM data streamed by the first data streamer 218, the Salesforce IQ metric generating service generates metrics for Acme's historical CRM data, such as suggestions for prioritizing contact with Acme's customers identified in Acme's historical CRM data. Although depicted in FIG. 2 as separate supply data pipelines that are connected to the first data streamer 218, the supply data pipelines 244 and 246 may be a single supply data pipeline that directly connects a data source to a data destination without directly connecting to any data streamer. Historical data can be information associated with past events. A data destination can be the place to which information is going or being sent.

In response to the dynamic selection of the data source, the data streaming service streams dynamic data from the data source to the data destination. For example, and without limitation, this can include the first data streamer 218 streaming Acme's live CRM data from an enterprise messaging platform for server 210's multi-tenant database 224 via the dedicated supply data pipelines 244 and 246 to the server 212 that provides the Salesforce IQ metric generating service. Dynamic data can be information that is characterized by change. Receiving Acme's live CRM data via the first data streamer 218 enables Salesforce IQ to generate metrics for Acme's live CRM data as this live data is being generated, such as generating the highest priority suggestion for an Acme account manager to email a detailed proposal for a deal with a customer upon receipt of data indicating a success meeting between an Acme sales representative and the customer.

After streaming dynamic data from the data source to the data destination, the data streaming service can stream other dynamic data from the data destination to the data source, based on the dynamic selection of the data source. By way of example and without limitation, this can include the first data streamer 218 creating the dedicated return data pipeline 248 between the server 212 and the first data streamer 218, creating the dedicated return data pipeline 250 between the first data streamer 218 and the server 210, and using the updater 240 to stream the Salesforce IQ metrics for Acme's live CRM data back to server 210's multi-tenant database 224 and use bulk processing to update the multi-tenant database 224 with the Salesforce IQ metrics. If the first data streamer 218 has already created the dedicated return data pipelines 248 and 250, the first data streamer uses the dynamic selection of Acme's CRM data stored on server 210's multi-tenant database 224 to identify the dedicated return data pipelines 248 and 250. Whether a data streaming service needs to create dedicated return data pipelines or identify already created dedicated return data pipelines, a data streaming service uses the dynamic data selection of the data source as a security measure to stream data back to the dynamically selected data source for authenticated subscribers only. Although depicted in FIG. 2 as separate return data pipelines that are connected to the first data streamer 218, the return data pipelines 248 and 250 may be a single return data pipeline that directly connects a data destination to a data source without directly connecting to any data streamer.

The only data that the first data streamer 218 streams from server 210 is Acme's CRM data, such that no system resources are spent on streaming or analyzing the data for the other 9 organizations that store data in server 210's multi-tenant database 224 but do not subscribe to the data services. System resources are incrementally scaled up and down as needed to stream and analyze the data for the data service subscribers only with each addition of a new subscription and each cancellation of an existing subscription, without affecting the non-subscribers' access to their data in server 210's multi-tenant database 224, or affecting the previous subscribers' access to their data in server 208's multi-tenant database 222.

Figure 3:
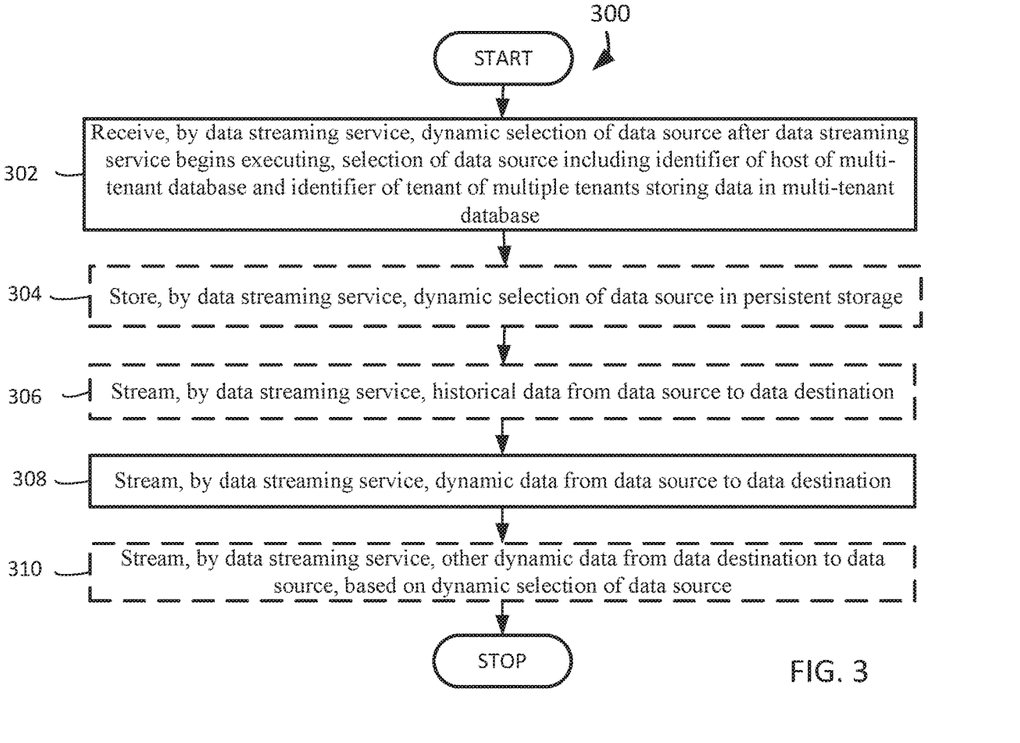
FIG. 3 is an operational flow diagram illustrating a high-level overview of a method for dynamic selection of data sources for streaming dynamic data, in an embodiment.

FIG. 3 is an operational flow diagram illustrating a high-level overview of a method 300 for dynamic selection of data sources for streaming dynamic data. As shown in FIG. 3, a data streaming service streams dynamic data from a dynamically selected data source.

A data streaming service receives a dynamic selection of a data source after the data streaming service begins executing, the dynamic selection of the data source including an identifier of a host of a multi-tenant database and an identifier of a tenant of multiple tenants storing data in the multi-tenant database, block 302. The system receives a dynamic selection of a data source to be streamed. For example, and without limitation, this can include the data streaming service receiving a system administrator's selection of Acme Corporation's CRM data that is stored in server 210's multi-tenant database 224 as a data source for the data streaming service, after the data streaming service has already been streaming data.

After receiving the dynamic selection of the data source, the data streaming service optionally stores the dynamic selection of the data source in persistent storage, block 304. The system can persist the dynamic selection of the data source for subsequent use. By way of example and without limitation, this can include the data streaming service storing the system administrator's selection of Acme Corporation's CRM data that is stored in server 210's multi-tenant database 224 as a data source for the data streaming service into the orchestration database 230.

Having received the dynamic selection of the data sources, the data streaming service optionally streams historical data from the data source to a data destination, block 306. The system can stream historical data from the dynamically selected data source before streaming live data from the selected data source. In embodiments, this can include the data streaming service streaming Acme's historical CRM data from server 210's multi-tenant database 224 to a customer data metric generating service.

In response to the dynamic selection of the data source, the data streaming service streams dynamic data from the data source to a data destination, block 308. The system streams live data from the dynamically selected data source. For example, and without limitation, this can include the data streaming service streaming Acme's live CRM data from server 210's multi-tenant database 224 to a customer data metric generating service.

After streaming dynamic data from the data source to the data destination, the data streaming service optionally streams other dynamic data from the data destination to the data source, based on the dynamic selection of the data source, block 310. The system can return processed data to the multi-tenant database. By way of example and without limitation, this can include the data streaming service streaming the generated metrics for Acme's live CRM data back to server 210's multi-tenant database 224.

The method 300 may be repeated as desired. Although this disclosure describes the blocks 302-310 executing in a particular order, the blocks 302-310 may be executed in a different order. In other implementations, each of the blocks 302-310 may also be executed in combination with other blocks and/or some blocks may be divided into a different set of blocks.

System Overview

Figure 4:
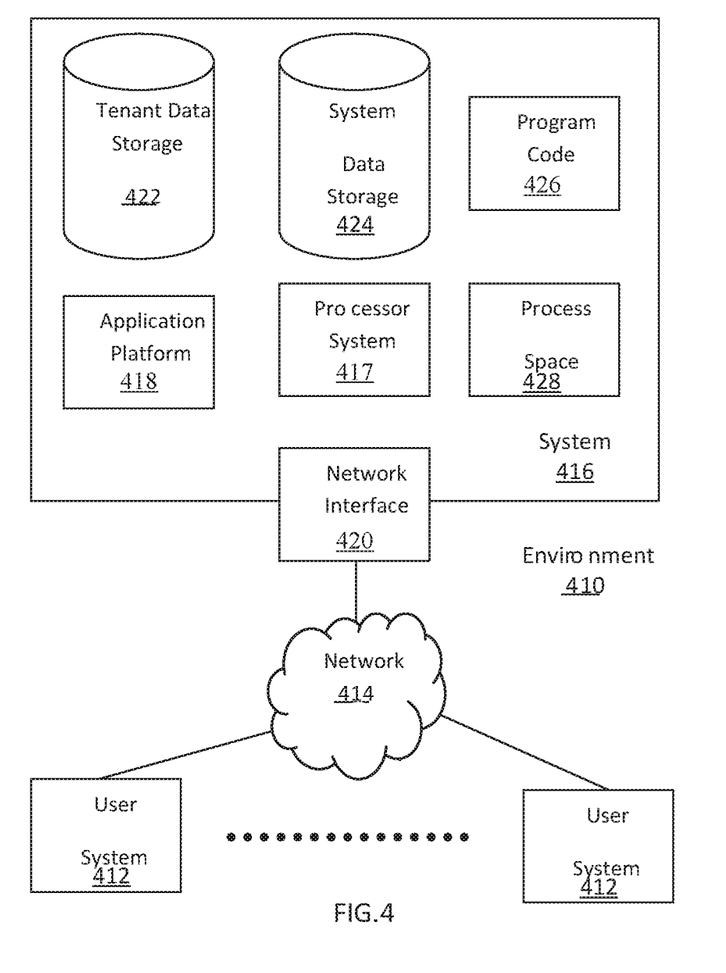
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
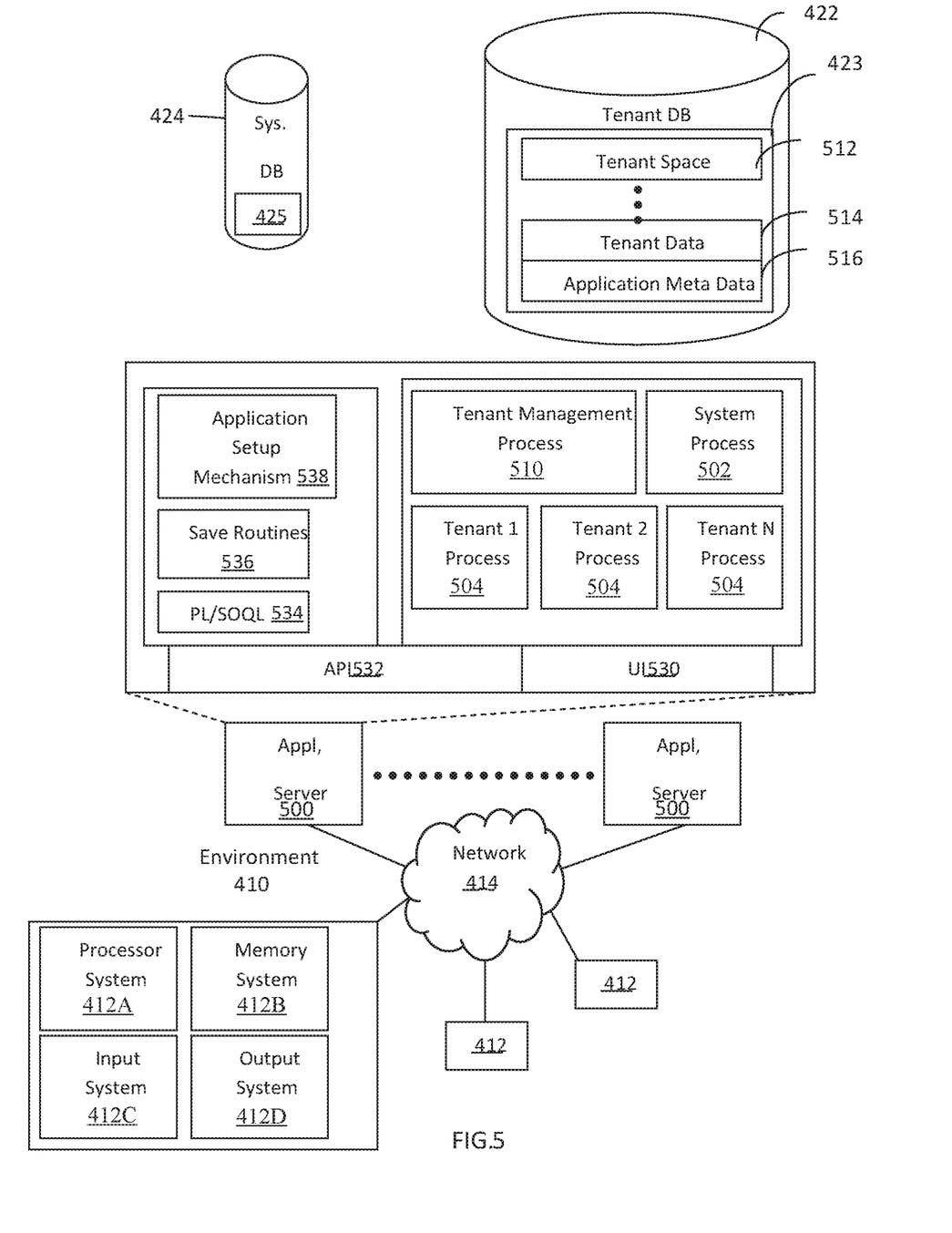
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which can be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server 500$_1$ might be coupled via the network 414 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
   one or more processors; and a non-transitory computer readable medium storing a plurality of instructions, which when executed, cause the one or more processors to:
receive, by a data streaming service, a dynamic selection of a data source after the data streaming service begins streaming data to a data destination from another data source comprising data that a first multi-tenant database stores for a first tenant, of multiple tenants, in a first host, the dynamic selection of the data source comprising an identifier of a second host of a second multi-tenant database and an identifier of a second tenant of multiple tenants storing data in the second multi-tenant database; and
stream, by the data streaming service, dynamic data from the data source, comprising data that the second multi-tenant database stores for the second tenant in the second host, to the data destination.

2. The system of claim 1, wherein receiving the dynamic selection of the data source is via a listening port.

3. The system of claim 1, comprising further instructions, which when executed, cause the one or more processors to store, by the data streaming service, the dynamic selection of the data source in persistent storage.

4. The system of claim 1, comprising further instructions, which when executed, cause the one or more processors to stream, by the data streaming service, historical data from the data source to the data destination.

5. The system of claim 1, wherein streaming the dynamic data from the data source to the data destination is via a data pipeline.

6. The system of claim 1, comprising further instructions, which when executed, cause the one or more processors to stream, by the data streaming service, based on the dynamic selection of the data source, other dynamic data from the data destination to the data source via a data pipeline.

7. The system of claim 1, wherein streaming the dynamic data from the data source to the data destination includes streaming only the dynamic data of the tenant identified by the dynamic selection from the second multi-tenant database.

8. A computer program product comprising a non-transitory computer-readable medium having computer readable program code embodied therein to be executed by one or more processors, the program code including instructions to:
receive, by a data streaming service, a dynamic selection of a data source after the data streaming service begins streaming data to a data destination from another data source comprising data that a first multi-tenant database stores for a first tenant, of multiple tenants, in a first host, the dynamic selection of the data source comprising an identifier of a second host of a second multi-tenant database and an identifier of a second tenant of multiple tenants storing data in the second multi-tenant database; and
stream, by the data streaming service, dynamic data from the data source, comprising data that the second multi-tenant database stores for the second tenant in the second host, to the data destination.

9. The computer program product of claim 8, wherein receiving the dynamic selection of the data source is via a listening port.

10. The computer program product of claim 8, wherein the program code comprises further instructions to store, by the data streaming service, the dynamic selection of the data source in persistent storage.

11. The computer program product of claim 8, wherein the program code comprises further instructions to stream, by the data streaming service, historical data from the data source to the data destination.

12. The computer program product of claim 8, wherein streaming the dynamic data from the data source to the data destination is via a data pipeline.

13. The computer program product of claim 8, wherein the program code comprises further instructions to stream, by the data streaming service, based on the dynamic selection of the data source, other dynamic data from the data destination to the data source.

14. The computer program product of claim 13, wherein streaming the dynamic data from the data destination to the data source is via a data pipeline.

15. A method comprising:
receiving, by a data streaming service, a dynamic selection of a data source after the data streaming service begins streaming data to a data destination from another data source comprising data that a first multi-tenant database stores for a first tenant, of multiple tenants, in a first host, the dynamic selection of the data source comprising an identifier of a second host of a second multi-tenant database and an identifier of a second tenant of multiple tenants storing data in the second multi-tenant database; and
streaming, by the data streaming service, dynamic data from the data source, comprising data that the second multi-tenant database stores for the second tenant in the second host, to the data destination.

16. The method of claim 15, wherein receiving the dynamic selection of the data source is via a listening port.

17. The method of claim 15, further comprising storing, by the data streaming service, the dynamic selection of the data source in persistent storage.

18. The method of claim 15, further comprising streaming, by the data streaming service, historical data from the data source to the data destination.

19. The method of claim 15, wherein streaming the dynamic data from the data source to the data destination is via a data pipeline.

20. The method of claim 15, the method further comprising streaming, by the data streaming service, based on the dynamic selection of the data source, other dynamic data from the data destination to the data source via a data pipeline.

* * * * *